F. L. MORSE.
SPRING SPROCKET WHEEL FOR DRIVE CHAINS.
APPLICATION FILED MAR. 10, 1913.

1,165,529.

Patented Dec. 28, 1915.

WITNESSES

INVENTOR
Frank L. Morse
BY
Edward Wright
ATTORNEY

UNITED STATES PATENT OFFICE.

FRANK L. MORSE, OF ITHACA, NEW YORK, ASSIGNOR TO MORSE CHAIN COMPANY, OF ITHACA, NEW YORK, A CORPORATION OF NEW YORK.

SPRING SPROCKET-WHEEL FOR DRIVE-CHAINS.

1,165,529.  Specification of Letters Patent.  Patented Dec. 28, 1915.

Application filed March 10, 1913. Serial No. 753,174.

*To all whom it may concern:*

Be it known that I, FRANK L. MORSE, a citizen of the United States, residing at Ithaca, in the county of Tompkins and State of New York, have invented a certain new and useful Improvement in Spring Sprocket-Wheels for Drive-Chains, of which improvement the following is a specification.

This invention relates to sprocket wheels for drive chains, and has for its object to provide an improved two part sprocket wheel having yielding connecting means between said parts for the purpose of preventing vibrations of the drive chain due to shocks or irregularities in the stress transmitted by the chain caused by variations in the load or power.

Figure 1:
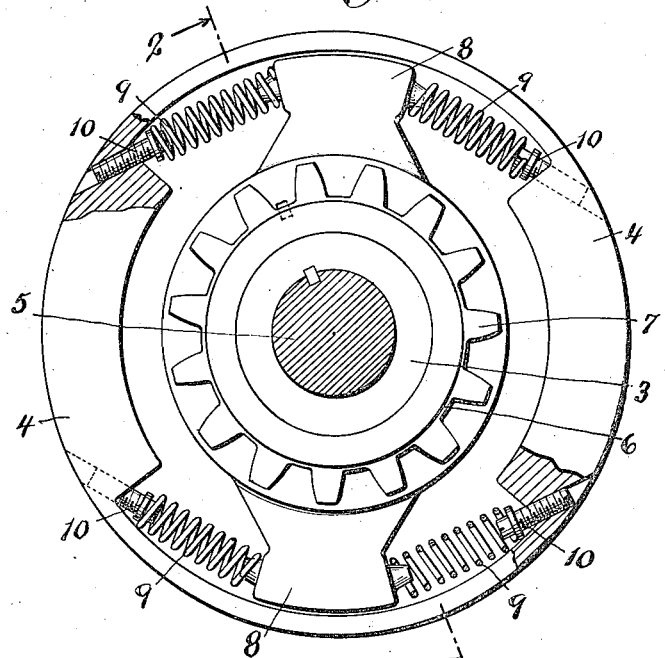
Figure 2:
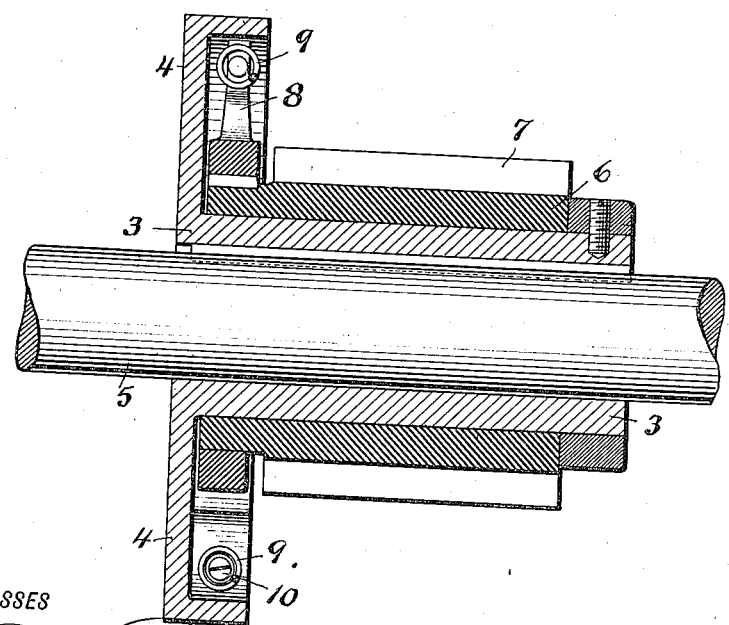

In the accompanying drawings: Figure 1 is a side elevation of a sprocket wheel embodying my improvement; and Fig. 2 is a sectional view taken on the line 2—2 of Fig. 1.

In the use of drive chains with rigid sprocket wheels it has been found that owing to the irregularities in the stresses to which the chain is subjected, a lateral vibration of the chain is sometimes produced, which may cause unnecessary friction and wear of the chain and be very detrimental to its successful and efficient operation.

Spring sprocket wheels having the yielding element located between the respective parts of the wheel and within the circle of the sprocket teeth, have heretofore been employed, but such construction is impracticable for wheels of small diameter, such as the small driving sprocket of many power chain drives, on account of the limited space available and the short lever arm and restricted action of the spring. My improvement therefore comprises a construction in which the parts of the wheel are provided with radial arms or projections extending out beyond the circle of the sprocket teeth and having the yielding or spring connection between the outer portions of the respective projecting portions beyond the sprocket teeth, whereby the spring may have a long lever arm and a wider range of movement.

According to the construction shown in the drawing, the sprocket wheel is formed in two parts, the hub portion, 3, keyed upon the shaft, 5, and provided at one end with a radially projecting portion, 4, which may be in the form of a disk, and the sprocket portion, 6, rotatably mounted on the hub portion, 3, and having teeth, 7, the part, 6, extending to one side of the teeth, 7, and provided with radially projecting arms, 8, extending out beyond the sprocket teeth.

The projecting disk portion, 4, may be recessed or cut away at certain parts to accommodate the projecting arms, 8, and springs, 9, having adjusting screws, 10, are located between said projecting portions of the respective parts of the wheel at a point farther from the center than the sprocket teeth, in which location the springs are readily accessible and have a longer leverage and a wider range of movement.

It will now be evident that by means of the construction above described, the outer part, 6, of the sprocket wheel is mounted to have a slight rotary movement relative to the inner or hub portion, 3, so that when the resistance of the work is variable, or the power transmitted is intermittent, as would be the case with a driving motor having a reciprocating motion, the irregularities are absorbed by the springs between the relatively movable parts of the sprocket wheel and any undue vibration of the drive chain is prevented.

Having now described my invention, what I claim as new and desire to secure by Letters Patent is:

1. A sprocket wheel comprising a portion adapted to be keyed upon a shaft, another portion mounted rotatably relative to the first portion and having sprocket teeth, both of said portions being provided with radially projecting members at one side of said teeth and extending out beyond the outer perimeter of said teeth, and springs interposed between the radially projecting members of the respective portions at a point beyond said sprocket teeth.

2. A sprocket wheel comprising a hub portion adapted to be keyed upon a shaft, an outer portion mounted rotatably on the hub portion and having sprocket teeth, both of said portions being provided with radially projecting members at one side of said teeth and extending out beyond the outer perimeter of said teeth, and springs interposed between the radially projecting members of the respective portions at a point beyond said sprocket teeth.

3. A sprocket wheel comprising a hub portion adapted to be keyed to a shaft, an outer portion rotatably mounted on the hub portion and having sprocket teeth, the hub portion being provided with a radially projecting disk extending out beyond and at one side of the sprocket portion and having a recess, the sprocket portion also having a radially projecting arm extending within said recess and out beyond the perimeter of said sprocket teeth, and springs interposed between said arm and the disk at a point farther from the center than the sprocket teeth.

FRANK L. MORSE.

Witnesses:
GLADYS I. EARLL,
P. C. COLT.